(12) United States Patent
Cox et al.

(10) Patent No.: US 11,820,483 B2
(45) Date of Patent: Nov. 21, 2023

(54) AIRCRAFT WITH REAR SPAR INTEGRATION ASSEMBLIES AND METHODS OF MANUFACTURING THEREOF

(71) Applicant: The Boeing Company, Chicago, IL (US)

(72) Inventors: Daniel Cox, Seattle, WA (US); Danilo Vukosav, Kirkland, WA (US); Evgeniy M. Potupchik, Mukilteo, WA (US); Francisco Del Valle, Seattle, WA (US); Ryan Matthew Slater, Lynnwood, WA (US); Timothy Robert Portway, Everett, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 17/518,844

(22) Filed: Nov. 4, 2021

(65) Prior Publication Data
US 2022/0169360 A1 Jun. 2, 2022

Related U.S. Application Data

(60) Provisional application No. 63/119,144, filed on Nov. 30, 2020.

(51) Int. Cl.
*B64C 1/06* (2006.01)
*B64C 1/26* (2006.01)

(52) U.S. Cl.
CPC .............. *B64C 1/065* (2013.01); *B64C 1/064* (2013.01); *B64C 1/069* (2013.01); *B64C 1/26* (2013.01)

(58) Field of Classification Search
CPC .......... B64C 1/065; B64C 1/064; B64C 1/069
See application file for complete search history.

(56) References Cited

U.S. PATENT DOCUMENTS

2013/0299636 A1\* 11/2013 Durand ..................... B64C 1/26
244/123.1
2018/0362141 A1\* 12/2018 Griess ....................... B64C 1/26

\* cited by examiner

*Primary Examiner* — Nicholas McFall
(74) *Attorney, Agent, or Firm* — Kwan & Olynick LLP

(57) ABSTRACT

Described herein are aircraft, comprising rear spar integration assemblies, and methods of manufacturing these aircraft. Specifically, an aircraft comprises a keel beam and a center wing box, comprising a rear spar. The rear spar is attached to the keel beam using a rear spar integration assembly. The assembly comprises a rear spar stiffener, attached to the rear spar, and having a stiffener load axis. The assembly also comprises and a keel beam fitting, attached to the keel beam, and having a fitting load axis. The rear spar stiffener is also attached to the keel beam fitting, e.g., using splice plates. More specifically, the fitting load axis is offset relative to the stiffener load axis along the primary axis of the aircraft. This offset is designed to compensate for a bending moment at the keel beam-rear spar interface, which allows reducing the size and/or the number of fasteners needed.

20 Claims, 8 Drawing Sheets

AIRCRAFT WITH REAR SPAR INTEGRATION ASSEMBLIES AND METHODS OF MANUFACTURING THEREOF

CROSS-REFERENCE TO RELATED APPLICATIONS

This application claims the benefit under 35 U.S.C. § 119(e) of U.S. Provisional Patent Application 63/119,144, filed on 2020 Nov. 30, which is incorporated herein by reference in its entirety for all purposes.

BACKGROUND

Aircraft can experience major loads during maneuverings, such as ascent or descent, and in particular during emergency conditions, such as pulling out of a dive or landing without the landing gear being deployed. More specifically, the lower fuselage portion of an aircraft experiences compression loads during ascent and tension loads during descent. A keel beam is often used in this fuselage portion to support these loads. Furthermore, a keel beam helps to compensate for any stiffness losses around the landing gear compartment. In some examples, the keel beam is attached to a center wing box and other parts of the fuselage to transfer and support various loads with the fuselage. However, attaching the keel beam to the center wing box can be challenging, in particular attaching the box's rear spar to the keel beam. For example, stiffeners are used for this rear spar-to-keel beam attachment. However, the stiffeners can be only installed after the keel beam and the center wing box are initially joined. Furthermore, the conventional approach limits the amount of eccentricity available in the vertical load path. This eccentricity limitation results in significant loads applied to fasteners, which in turn requires larger and/or more fasteners resulting in increased weight and cost of the aircraft. Other conventional approaches use additional structures, such as integral gussets at the rear spar-to-keel beam interface to reduce loads through vertical stiffeners. However, these additional structures also add weight and cost and often interfere with other surrounding components, such as hydraulic components, electrical components, and landing gear. Yet another approach utilizes a monolithic keel beam and an underwing web, which attaches to vertical stiffeners using shear splices. However, this design does not introduce sufficient eccentricity, described above, and also appears to be the heaviest of the described conventional approaches.

SUMMARY

Described herein are aircraft, comprising rear spar integration assemblies, and methods of manufacturing these aircraft. Specifically, an aircraft comprises a keel beam and a center wing box, comprising a rear spar. The rear spar is attached to the keel beam using a rear spar integration assembly. The assembly comprises a rear spar stiffener, attached to the rear spar, and having a stiffener load axis. The assembly also comprises and a keel beam fitting, attached to the keel beam, and having a fitting load axis. The rear spar stiffener is also attached to the keel beam fitting, e.g., using splice plates. More specifically, the fitting load axis is offset relative to the stiffener load axis along the primary axis of the aircraft. This offset is designed to compensate for a bending moment at the keel beam-rear spar interface, which allows reducing the size and/or the number of fasteners needed.

In some examples, an aircraft, having a primary axis extending between a front end and a rear end of the aircraft, comprises a keel beam, extending along the primary axis of the aircraft and a center wing box, attached to the keel beam and comprising a rear spar, facing the rear end of the aircraft. The aircraft also comprises a rear spar integration assembly, comprising a rear spar stiffener and a keel beam fitting, attached to the rear spar stiffener. The rear spar stiffener is attached to the rear spar of the center wing box and comprising a stiffener load axis. The keel beam fitting is attached to the keel beam and comprising a fitting load axis, parallel to the stiffener load axis and offset relative to the stiffener load axis in a direction of the primary axis of the aircraft.

In some examples, a method of manufacturing an aircraft, having a primary axis extending between a front end and a rear end of the aircraft, comprises attaching a keel beam fitting of a rear spar integration assembly to a keel beam, attaching a rear spar stiffener of the rear spar integration assembly to a rear spar of a center wing box, attaching the keel beam, with the keel beam fitting attached to the keel beam, to the center wing box, with the rear spar stiffener attached to the center wing box, and attaching the keel beam fitting to the rear spar stiffener.

In some examples, a rear spar integration assembly for installation on an aircraft comprising a keel beam and a center wing box, comprises a rear spar stiffener, comprising a first chord, a second chord, and a web, collectively forming a stiffener open channel such that the first chord is parallel to the second chord and such that the web interconnects the first chord and the second chord. The second chord is configured to interface and directly attach to a rear spar of the center wing box. The rear spar integration assembly also comprises a keel beam fitting, comprising a first fitting side wall, a second fitting side wall, and a fitting base wall, collectively forming an open fitting channel such that the first fitting side wall is parallel to the second fitting side wall and such that the fitting base wall interconnects the first fitting side wall and the second fitting side wall. The fitting base wall is configured to interface and directly attach to the keel beam. The rear spar integration assembly further comprises a first splice plate and a second splice plate. The first splice plate and second splice plate are configured to stack with and attach to the web and the fitting base wall such that each of the web and the fitting base wall is positioned between the first splice plate and second splice plate.

DETAILED DESCRIPTION

Figure 1A:
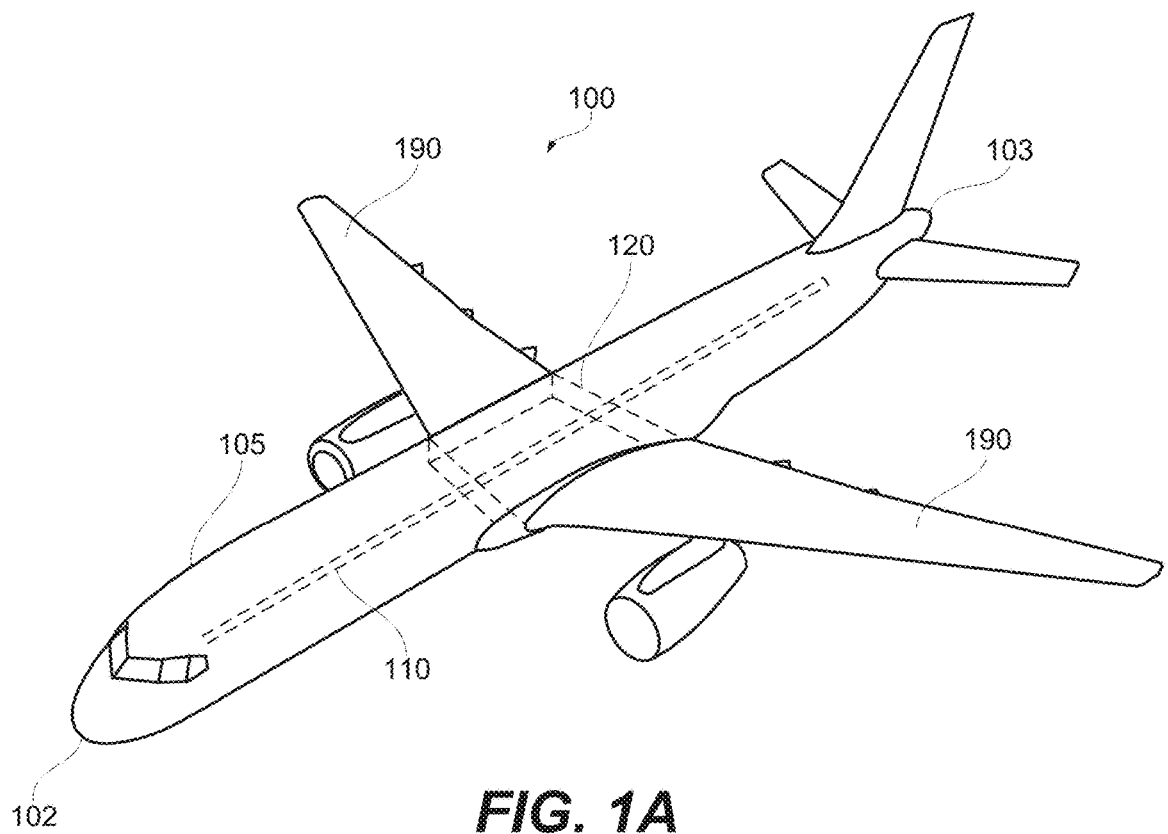
FIGS. 1A and 1B are schematic illustrations of an aircraft, illustrating relative positions of a keel beam and a center wing box in the aircraft, in accordance with some examples.
Figure 1B:
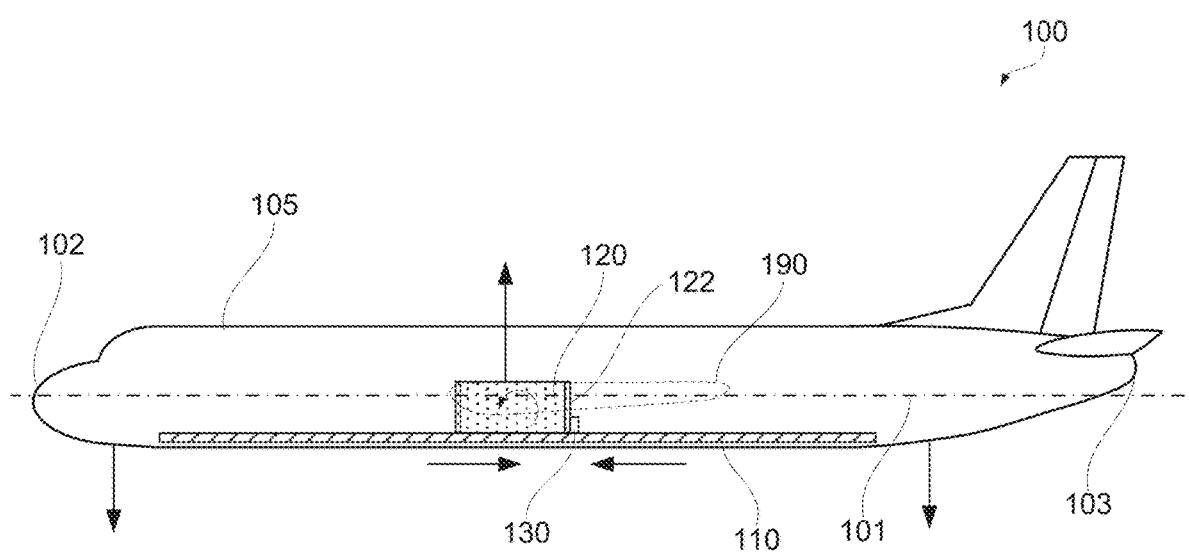

In the following description, numerous specific details are outlined to provide a thorough understanding of the presented concepts. In some examples, the presented concepts are practiced without some or all of these specific details. In other examples, well-known process operations have not been described in detail to unnecessarily obscure the described concepts. While some concepts will be described in conjunction with the specific examples, it will be understood that these examples are not intended to be limiting.
Introduction As noted above, aircraft can experience major loads during their operations, which are transferred through various interfaces such as between keel beams and center wing boxes. FIGS. 1A and 1B are schematic illustrations of aircraft 100, illustrating relative positions of keel beam 110 and center wing box 120, in accordance with some examples. Specifically, aircraft 100 comprises fuselage 105 extending between front end 102 and rear end 103 of aircraft 100. Rear end 103 may be also referred to as an aft end. The direction from front end 102 to rear end 103 may be referred to as an aft direction, while the direction from rear end 103 to front end 102 may be referred to as a front direction. Aircraft 100 also has primary axis 101 extending between front end 102 and rear end 103.

FIGS. 1A and 1B also illustrate wings 190, attached to fuselage 105 and, at least in some examples, supporting engines. More specifically, wings 190 are attached to center wing box 120, positioned within fuselage 105. Center wing box 120 provides continuity to wings 190 through fuselage 105 and is used to absorb various stresses during the operation of aircraft 100. In some examples, center wing box 120 has the shape of a parallelepiped. However, other shapes are also within the scope. Center wing box 120 is attached to keel beam 110, which is also positioned in fuselage 105, e.g., in a lower portion of fuselage 105. Keel beam 110 extends along primary axis 101 of aircraft 100 and is used to provide additional rigidity to fuselage 105 as well as support to center wing box 120.

As noted above, during the operation of aircraft 100, wings 190 and fuselage 105 experience various loads. FIG. 1B illustrates one example of such loads, e.g., during ascent and, in particular, when aircraft 100 is pulling out of a dive. In this example, the front and rear portions of fuselage 105 experience downward forces (e.g., due to the gravity and momentum) while wings 190 experience upward forces (e.g., due to the lift). Based on the overall geometry of the aircraft (e.g., wings 190 being positioned in the middle of fuselage 105), these forces create bending stresses resulting in fuselage 105 or, more specifically, keel beam 110 being under compression. One having ordinary skill in the art would understand that keel beam 110 can be under tension during other operating conditions, such as descent or landing.

It should be noted that the loads experienced by wings 190 are transmitted to center wing box 120, while the loads experienced by fuselage 105 are transmitted to keel beam 110. The attachment between center wing box 120 and keel beam 110 is responsible for supporting and balancing these loads. This disclosure focuses on one specific attachment between center wing box 120 and keel beam 110, which is an attachment between rear spar 122 of center wing box 120 and keel beam 110, which may be referred to as a rear spar-keel beam attachment. One having ordinary skill in the art would understand that rear spar 122 is the most-loaded wing spar for an aft-swept wing aircraft. Furthermore, keel beam 110 experiences the highest loads at this interface/attachment. It should be also noted that this rear spar-keel beam attachment is a singular edge connection of center wing box 120 and keel beam 110. The connection introduces step-function stiffness change and ties otherwise independent displacements of rear spar 122 and keel beam 110. Finally, rear spar 122 is one of the three major structural supports used for stability of keel beam 110, e.g., the keel beam column stability.

Figure 1C:
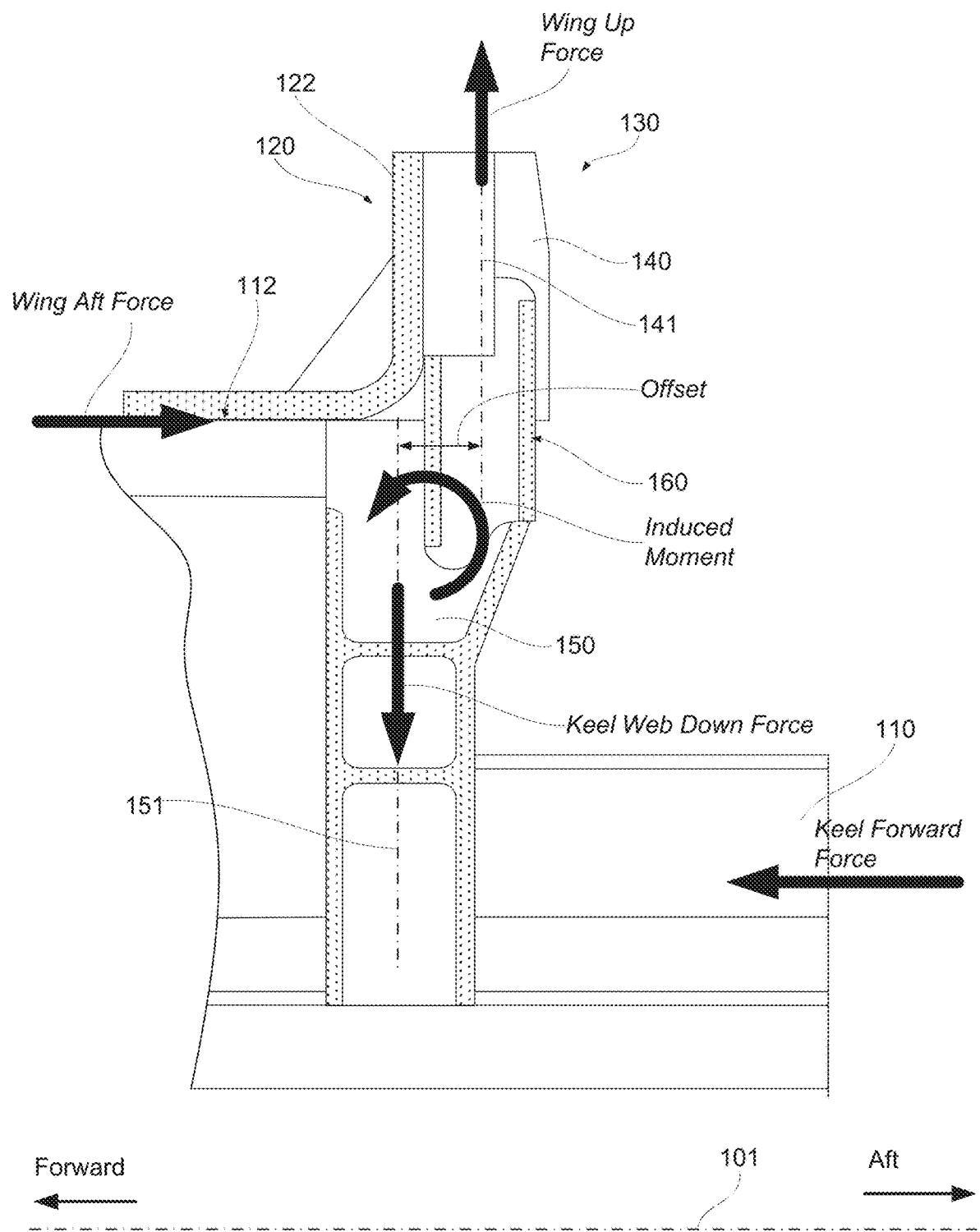
FIG. 1C is a schematic illustration of the interface between the keel beam and the center wing box in the aircraft of FIGS. 1A and 1B, also showing a rear spar integration assembly and forces, transferred by the rear spar integration assembly between the keel beam and the center wing box, in accordance with some examples.
Figure 2:
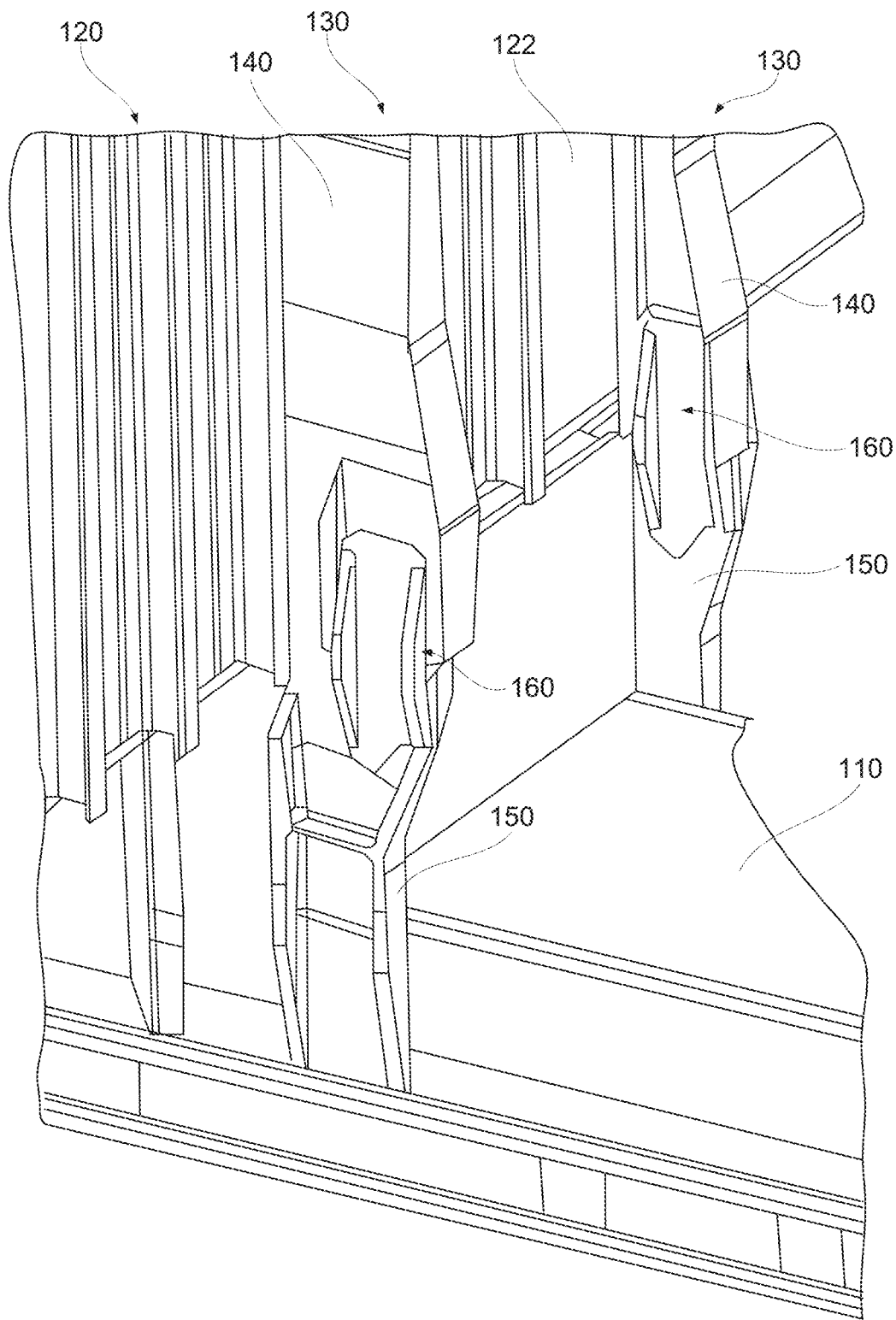
FIG. 2 is a perspective view of the interface between the keel beam and the center wing box in FIG. 1C showing two rear spar integration assemblies, in accordance with some examples.

This rear spar-keel beam attachment is subjected to very complex loads and is a statically indeterminate structure. The attachment is provided by rear spar integration assembly 130 (e.g., as schematically shown in FIG. 1C) or, in some examples, by multiple rear spar integration assemblies 130 (e.g., as schematically shown in FIG. 2). As described above, keel beam 110 carries large compressive loads during some operating conditions. Furthermore, center wing box 120 is rotating, which puts vertical loads on the rear spar-keel beam attachment. A combination of these loads puts a bending moment on the attachment. As further described below, rear spar integration assembly 130 is specifically designed (e.g., introducing an offset between load axes of different components) to reduce this bending moment at certain locations. This bending moment reduction corresponds to reduced fastener loads thereby allowing to use of smaller and/or fewer fasteners. Fasteners are not shown in FIG. 1C or FIG. 2 for clarity. Without being restricted to any particular design or theory, the bending moment reduction allows reducing the required number of fasteners in half. For example, when a reference "no-offset" design uses two fasteners of about 14 millimeters in diameter, a corresponding design with an offset allows reducing the side of fasteners to less than 10 millimeters in diameter. The bending moment reduction between keel beam 110 and center wing box 120 or, more specifically, at the interface of rear spar 122 and keel beam upper chord 112 reduces weight by requiring smaller and/or fewer fasteners (and, in some examples, shorter cross-section flange lengths of keel beam upper chord 112 due to the edge margin requirements) and/or using smaller and/or thinner keel beam upper chord 112 due to the lower bending moment. In addition to the weight savings attributed to the fasteners and keel beam upper chord 112, the bending moment reduction also allows for the smaller stock size for keel beam 110, which provides higher strength and lower weight along the full length of keel beam upper chord 112.

In particular, rear spar integration assembly 130 is configured to create an eccentric load path between rear spar 122 and keel beam 110. Referring to FIG. 1A, this eccentric load path, which may be also referred to as an offset load path, creates an induced moment that relieves the primary bending at this interface. This bending relief reduces the stress on fasteners, which attach rear spar integration assembly 130 to rear spar 122 and keel beam 110 and also interconnect different components of rear spar integration assembly 130.

FIG. 1C illustrates rear spar integration assembly 130 comprising rear spar stiffener 140 and keel beam fitting 150. Rear spar stiffener 140 is attached to keel beam fitting 150, e.g., using splice plates 160. Rear spar stiffener 140 is also attached to the rear spar 122 of the center wing box 120, e.g., using fasteners (not shown). Finally, keel beam fitting 150 is attached to the keel beam 110, e.g., also using fasteners (not shown).

As shown in FIG. 1C, rear spar stiffener 140 comprises stiffener load axis 141. Similarly, keel beam fitting 150 comprises fitting load axis 151. It should be noted stiffener load axis 141 and fitting load axis 151 do not correspond to geometric symmetries (of rear spar stiffener 140 and keel beam fitting 150). Instead, stiffener load axis 141 and fitting load axis 151 denote the lines along which the resultant load or reaction acts within rear spar integration assembly 130. In some examples, stiffener load axis 141 and fitting load axis 151 are located at the geometric centers of fastener groups or along the line of fasteners that are engaged in the dominant load transfer. Fitting load axis 151 is offset relative to the stiffener load axis 141 to provide the induced moment during the vertical loading of rear spar integration assembly 130. As such, this offset between rear spar stiffener 140 and keel beam fitting 150 relieves the primary bending by creating an induced moment. The offset dimension is determined based on various considerations, such as the vertical load, the amount of induced moment needed, other operations conditions, and the like.

It should be noted that rear spar stiffener 140 and keel beam fitting 150 are separate components, which are attached to form rear spar integration assembly 130. This component separation provides additional manufacturing flexibility and higher manufacturing rates. For example, center wing box 120 and keel beam 110 are manufactured independently from each other. Rear spar stiffener 140 is attached to center wing box 120 during the manufacturing of center wing box 120 and prior to joining center wing box 120 to keel beam 110. Similarly, keel beam fitting 150 is attached to keel beam 110 during the manufacturing of keel beam 110 and prior to joining keel beam 110 to center wing box 120. Rear spar stiffener 140 and keel beam fitting 150 are attached to each other later (to form rear spar integration assembly 130), e.g., when joining center wing box 120 and keel beam 110 as further described below.

Aircraft Examples

As noted above, FIGS. 1A and 1B are schematic illustrations of aircraft 100, presenting various features of keel beam 110 and center wing box 120. Various examples of aircraft 100 are within the scope, such as passenger aircraft, cargo aircraft, and the like. Aircraft 100 is designed to withstand various operating conditions, such as changes in altitude, pulling out of emergency dives, emergency landings without deployed landing gear, and the like. Some of these operating conditions are associated with loads acting on keel beam 110 and center wing box 120 and, in particular, acting on the interface between keel beam 110 and center wing box 120.

Referring to FIG. 1C, aircraft 100 also comprises rear spar integration assembly 130, which forms at least a part of the attachment between keel beam 110 and center wing box 120. As noted above, rear spar integration assembly 130 comprises at least two separate components, attached together to form rear spar integration assembly 130. This component separation is used for manufacturing flexibility, higher manufacturing throughput, alignment, and other reasons. Specifically, rear spar integration assembly 130 comprises rear spar stiffener 140 and keel beam fitting 150, attached to rear spar stiffener 140. Rear spar stiffener 140 is also attached to rear spar 122 of center wing box 120, while keel beam fitting 150 is attached to keel beam 110. However, various types of attachment methods and fasteners are within the scope.

As noted above with reference to FIG. 1C, rear spar stiffener 140 is offset relative to keel beam fitting 150. Specifically, rear spar stiffener 140 comprises stiffener load axis 141, while keel beam fitting 150 comprises fitting load axis 151. In some examples, fitting load axis 151 is parallel to stiffener load axis 141. Furthermore, fitting load axis 151 is offset relative to stiffener load axis 141 in the direction of primary axis 101 of aircraft 100. This offset creates a secondary moment, which relieves the primary bending at this interface at least during some operating conditions (e.g., pulling out of an emergency dive).

In some examples, fitting load axis 151 is offset relative to stiffener load axis 141 by between about 20 millimeters and 80 millimeters or, more specifically, between about 40 millimeters and 60 millimeters. It should be noted that a higher offset value corresponds to a higher induced moment. While a higher induced moment is beneficial for certain operating conditions (e.g., pulling out of an emergency dive), a lower induced moment or even a negative induced moment is desirable for other operating conditions (e.g., an emergency landing without deployed landing gear). For a given configuration and loading, the offset value is specifically selected to minimize the bending moment (at critical locations), avoid excessive loads at other locations (e.g., where the moments are additive), and prevent any failures in the vertical loadpath in case of an emergency landing (e.g., with or without retracted gear). In some examples, fitting load axis 151 is offset relative to stiffener load axis 141 in the direction toward front end 102 of aircraft 100. One having ordinary skill in the art would understand that the offset direction determined the direction of the secondary moment, which may be also referred to as an induced moment.

Figures 3A, 3B:
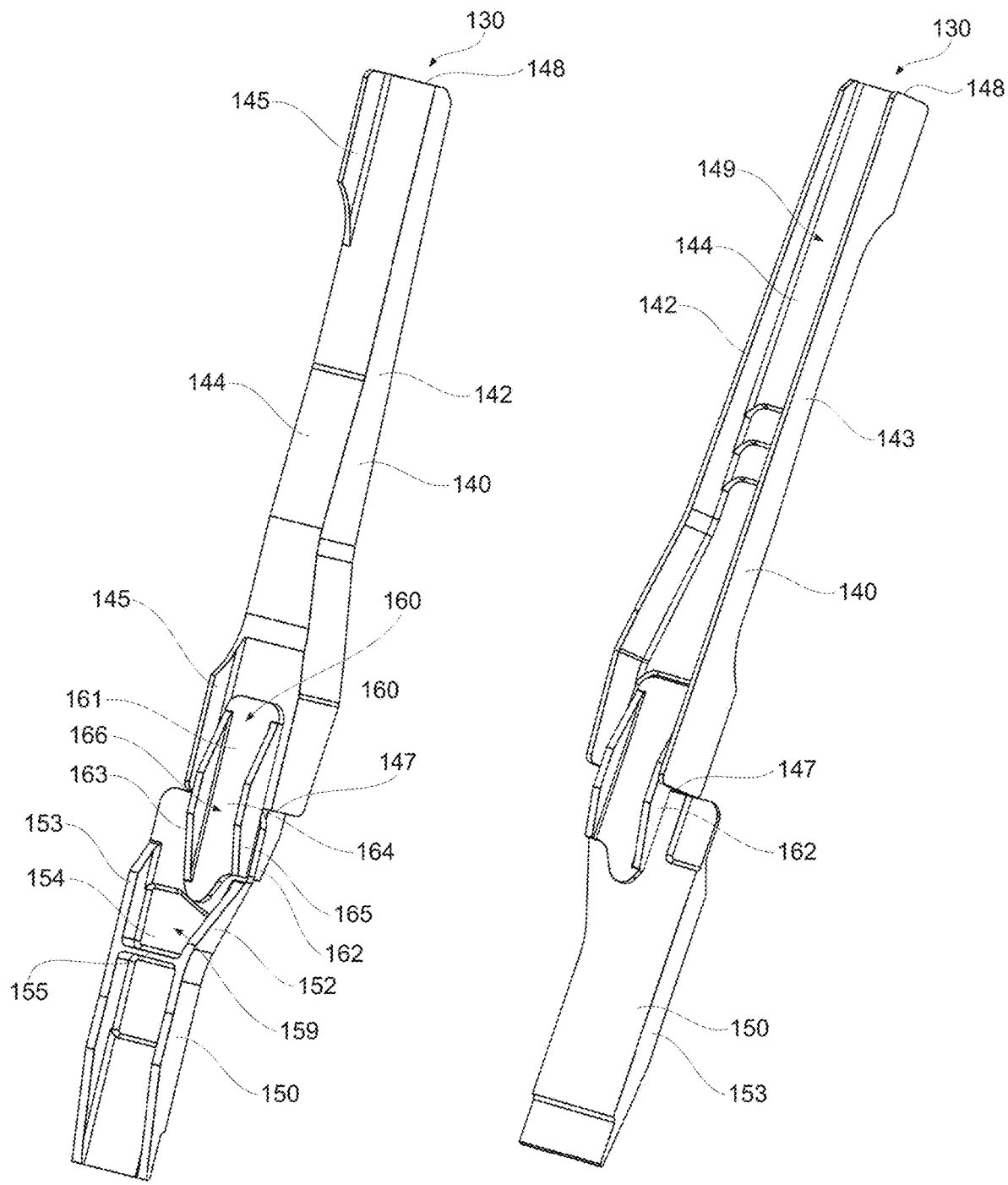
FIGS. 3A and 3B are two perspective views of the rear spar integration assembly in FIG. 1C and FIG. 2, in accordance with some examples.

Referring to FIGS. 2, 3A, and 3B, in some examples, rear spar integration assembly 130 further comprises one or more splice plates 160, attaching keel beam fitting 150 to rear spar stiffener 140. For example, one or more splice plates 160 comprises first splice plate 161 and second splice plate 162, as shown in FIGS. 3A and 3B. Each of keel beam fitting 150 and rear spar stiffener 140 is stacked between first splice plate 161 and second splice plate 162. Each splice plate overlaps with each of keel beam fitting 150 and rear spar stiffener 140, forming separate interfaces and separate attachment points. With splice places, keel beam fitting 150 and rear spar stiffener 140 do not need to overlap directly, which helps with the initial alignment and joining of keel beam 110 and center wing box 120. It should be noted that during this initial alignment operation, keel beam fitting 150 is already attached to keel beam 110, while rear spar stiffener 140 is attached to center wing box 120. In some examples, keel beam fitting 150 and rear spar stiffener 140 have no direct contact with each other in rear spar integration assembly 130.

Referring to FIG. 3B, in some examples, rear spar stiffener 140 comprises first chord 142, second chord 143, and web 144. These walls collectively form stiffener open channel 149. More specifically, first chord 142 is parallel to second chord 143. Web 144 interconnects first chord 142 and second chord 143. Furthermore, web 144 is perpendicular to each of first chord 142 and second chord 143, which corresponds to a rectangular cross-sectional profile of stiffener open channel 149. This profile improves the mechanical strength of rear spar stiffener 140, in particular the resistance to bending. Furthermore, this channel profile allows attaching rear spar stiffener 140 to center wing box 120 and keel beam 110 along different planes, e.g., perpendicular planes. For example, second chord 143 interfaces and is directly attached to rear spar 122 of center wing box 120. In the same or other examples, web 144 is used for attaching rear spar stiffener 140 to keel beam fitting 150. Furthermore, stiffener open channel 149 is configured to receive a portion of second splice plate 162 when second splice plate 162 is attached to rear spar stiffener 140

In some examples, rear spar stiffener 140 further comprises one or more extensions 145, extending from web 144 and away from second chord 143. For example, second chord 143 and one or more extensions 145 are coplanar. Extensions 145 are used to improve the rigidity of rear spar stiffener 140, at respective ends of rear spar stiffener 140.

Figure 3C:
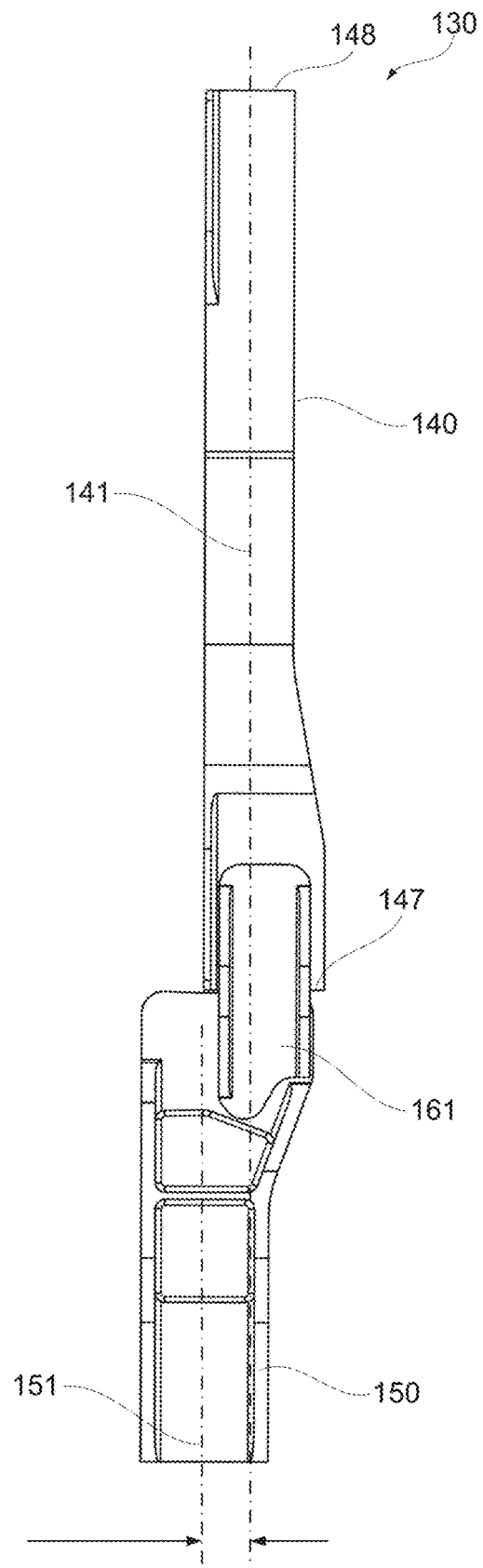
FIG. 3C is a front view of the rear spar integration assembly in FIG. 1C and FIG. 2, in accordance with some examples.

Referring to FIGS. 3A and 3B and, in particular to FIG. 3C, in some examples, web 144 is wider at first end 147, facing keel beam fitting 150, than at second end 148, which is opposite to first end 147. The additional width at first end 147 provides more surface for attaching to splice plates 160 and some additional mechanical strength at this interface. Furthermore, this additional width allows protruding at least one of splice plates 160 into stiffener open channel 149 of rear spar stiffener 140.

Referring to FIGS. 3A and 3B, in some examples, keel beam fitting 150 comprises first fitting side wall 152, second fitting side wall 153, and fitting base wall 154, collectively forming open fitting channel 159. More specifically, first fitting side wall 152 is parallel to second fitting side wall 153. Fitting base wall 154 interconnects first fitting side wall 152 and second fitting side wall 153. As such, open fitting channel 159 has a rectangular cross-section to improve the rigidity of keel beam fitting 150. Fitting base wall 154 interfaces and is directly attached to keel beam 110.

In some examples, keel beam fitting 150 comprises channel divider 155, extending from fitting base wall 154 and between first fitting side wall 152 and second fitting side wall 153. Channel divider 155 is perpendicular to each of fitting base wall 154, first fitting side wall 152, and second fitting side wall 153. Channel divider 155 is used to improve the rigidity of keel beam fitting 150.

In some examples, fitting base wall 154 of keel beam fitting 150 and web 144 of rear spar stiffener 140 are coplanar after rear spar integration assembly 130 is assembled or at least when keel beam 110 and center wing box 120 are aligned. This relative orientation of fitting base wall 154 and web 144 provides for the efficient load transfer through rear spar integration assembly 130 and between keel beam 110 and center wing box 120. In some examples, this orientation of fitting base wall 154 and web 144 is used for alignment of keel beam 110 and center wing box 120 when initially joining keel beam 110 and center wing box 120. More specifically, keel beam 110 and center wing box 120 are aligned until fitting base wall 154 of keel beam fitting 150 and web 144 of rear spar stiffener 140 are coplanar. It should be noted that keel beam fitting 150 is already attached to keel beam 110 and rear spar stiffener 140 is already attached to center wing box 120 during this joining operation. Furthermore, because fitting base wall 154 and web 144 are co-planar, fitting base wall 154 and web 144 do not overlap and do not interfere with each other during alignment and joining of keel beam 110 and center wing box 120.

In some examples, rear spar integration assembly 130 further comprises one or more splice plates 160, interfacing, and directly attached to each of web 144 and fitting base wall 154. Splice plates 160 are used to attach keel beam fitting 150 and rear spar stiffener 140, e.g., after aligning and joining of keel beam 110 and center wing box 120. In some examples, at least one of one or more splice plates 160 protrudes into stiffener open channel 149 as, e.g., is shown in FIG. 3B.

Figure 3D:
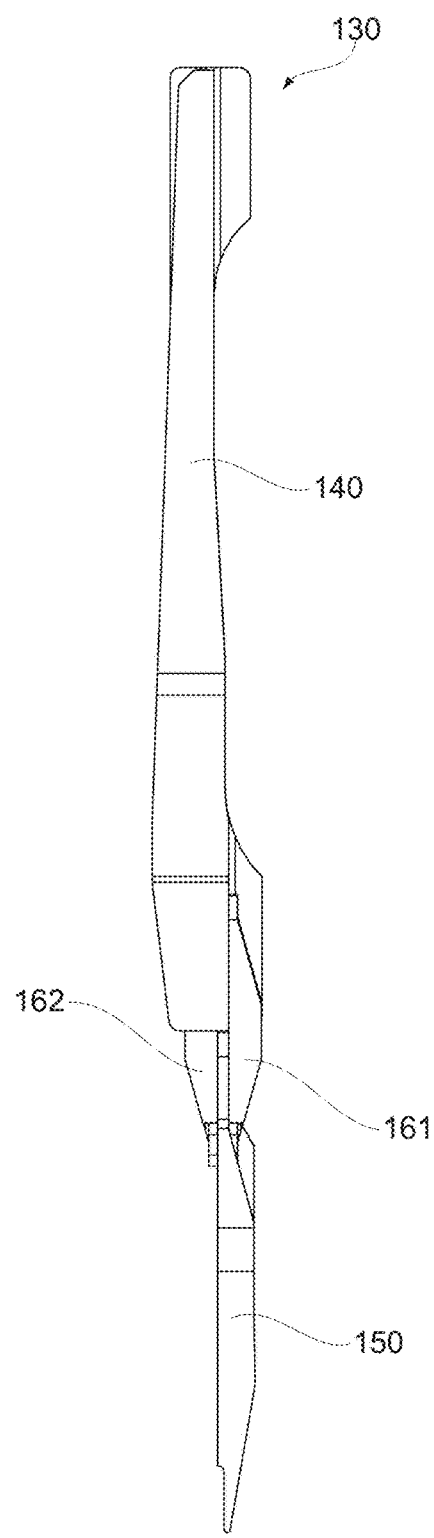
FIG. 3D is a side view of the rear spar integration assembly in FIG. 1C and FIG. 2, in accordance with some examples.

Referring to FIGS. 3A and 3D, in some examples, one or more splice plates 160 comprise first splice plate 161 and second splice plate 162. Each of web 144 and fitting base wall 154 is positioned between first splice plate 161 and second splice plate 162. Furthermore, each of web 144 and fitting base wall 154 is attached to first splice plate 161 and second splice plate 162. For example, a first set of fasteners protrudes through a stack formed by first splice plate 161, web 144, and second splice plate 162. More specifically, each fastener in the first set protrudes through this stack formed by first splice plate 161, web 144, and second splice plate 162. In a similar manner, a second set of fasteners protrudes through a stack formed by first splice plate 161, fitting base wall 154, and second splice plate 162.

In some examples, each of one or more splice plates 160 comprises first splice side wall 163, second splice side wall 164, and splice base wall 165, collectively forming splice open channel 166. First splice side wall 163 and second splice side wall 164 are parallel to each other and perpendicular to splice base wall 165, which extends between first splice side wall 163 and second splice side wall 164. Splice base wall 165 directly interfaces web 144 and fitting base wall 154.

Examples of Rear Spar Integration Assemblies

In some examples, rear spar integration assembly 130 is provided as a kit and used for installation on aircraft 100. At this stage, rear spar integration assembly 130 or components of rear spar integration assembly 130 are not attached to each other and to, e.g., keel beam 110 and/or center wing box 120. Various features of rear spar integration assembly 130, described above in the context of aircraft 100, are applicable to rear spar integration assembly 130, provided as a kit. For example, rear spar integration assembly 130 comprises rear spar stiffener 140 and keel beam fitting 150.

In some examples, rear spar stiffener 140 comprises first chord 142, second chord 143, and web 144, collectively forming stiffener open channel 149 as, e.g., is shown in FIG. 3B. First chord 142 is parallel to second chord 143, while web 144 interconnects first chord 142 and second chord 143. Second chord 143 is configured to interface and directly attach to a rear spar 122 of center wing box 120 as described above with reference to FIG. 2.

In some examples, keel beam fitting 150 comprises first fitting side wall 152, second fitting side wall 153, and fitting base wall 154, collectively forming open fitting channel 159 as, e.g., is shown in FIG. 3A. First fitting side wall 152 is parallel to second fitting side wall 153. Fitting base wall 154 interconnects first fitting side wall 152 and second fitting side wall 153. Furthermore, fitting base wall 154 is configured to interface and directly attach to keel beam 110 as described above with reference to FIG. 2.

In some examples, rear spar integration assembly 130, provided as a kit, also comprises first splice plate 161 and second splice plate 162. First splice plate 161 and second splice plate 162 are configured to stack with and attach to web 144 and fitting base wall 154 such that each of web 144 and fitting base wall 154 is positioned between first splice plate 161 and second splice plate 162.

Aircraft Manufacturing Examples

Figure 4:
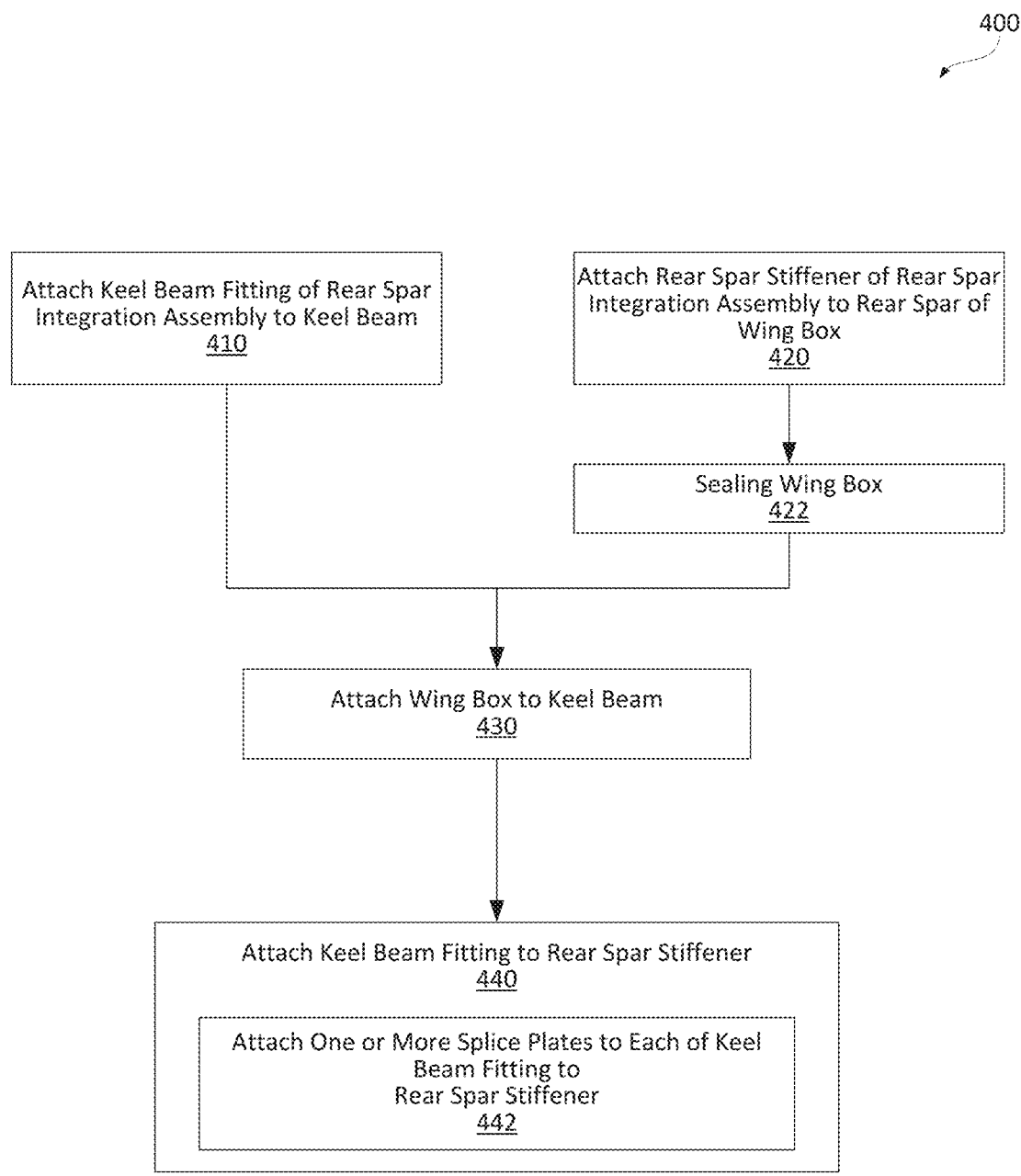
FIG. 4 is a process flowchart corresponding to a method of manufacturing an aircraft comprising a rear spar integration assembly, attaching a keel beam and a center wing box of the aircraft, in accordance with some examples.

FIG. 4 is a process flowchart corresponding to method 400 of manufacturing aircraft 100, in accordance with some examples. Various examples of aircraft 100 and rear spar integration assembly 130, used in aircraft 100, are described above. As a reference, aircraft comprises primary axis 101 extending between front end 102 and rear end 103 of aircraft 100.

Figure 5:
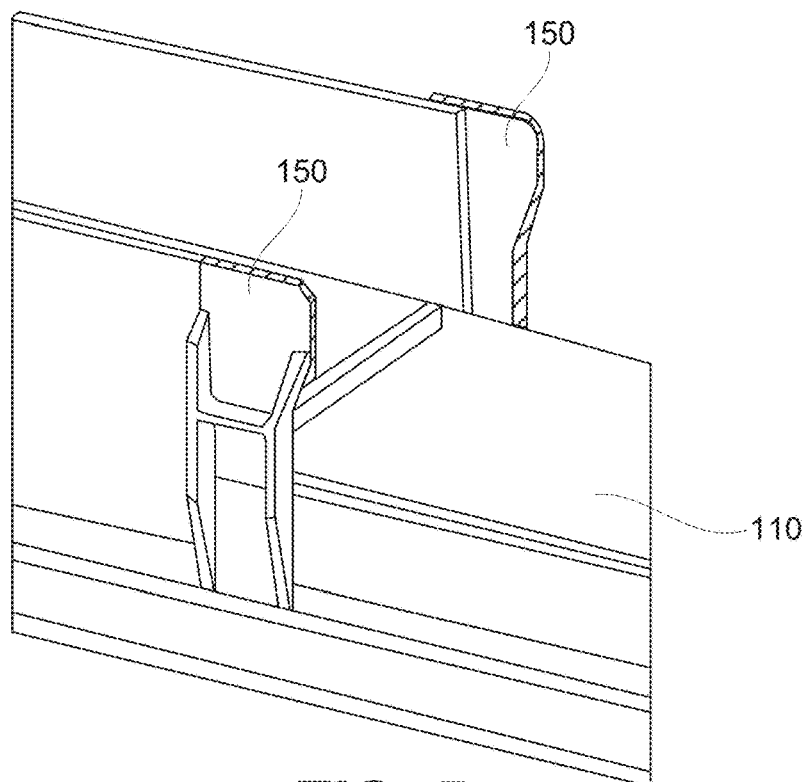
FIG. 5 is a perspective view of a keel beam fitting, attached to a keel beam, in accordance with some examples.

In some examples, method 400 comprises (block 410) attaching keel beam fitting 150 of rear spar integration assembly 130 to keel beam 110 as, e.g., is schematically shown in FIG. 5. More specifically, FIG. 5 illustrates two keel beam fittings 150 attached to the same keel beam 110 and facing each other. Various types of fasteners, such as rivets, are used for this attachment operation. Fasteners are not shown in FIG. 5 for clarity. It should be noted that at this stage, keel beam fittings 150 are not attached to rear spar stiffeners 140.

Figure 6:
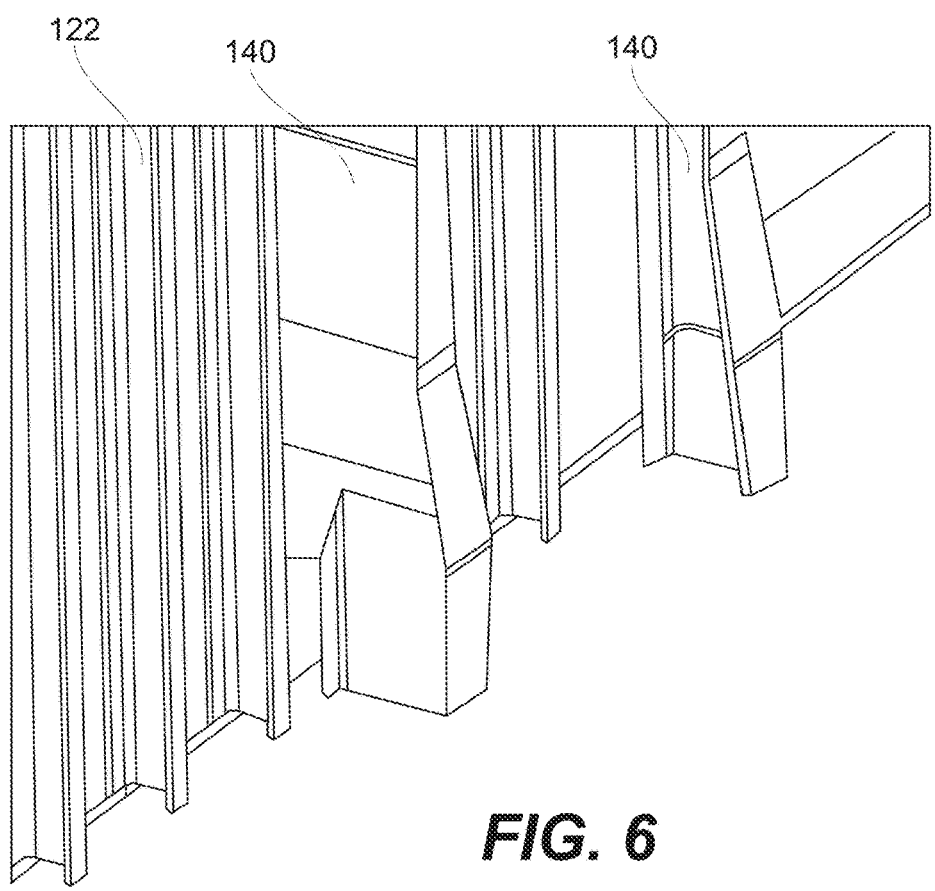
FIG. 6 is a perspective view of a rear spar stiffener, attached to the rear spar of the center wing box, in accordance with some examples.

In some examples, method 400 also comprises (block 420) attaching rear spar stiffener 140 of rear spar integration assembly 130 to rear spar 122 of center wing box 120 as, e.g., is schematically shown in FIG. 6. More specifically, FIG. 6 illustrates two rear spar stiffeners 140 attached to the same rear spar 122. It should be noted that at this stage, rear spar stiffeners 140 are not attached to keel beam fittings 150. However, the position of rear spar stiffeners 140, relative to rear spar 122, correspond to the position of keel beam fittings 150, relative to keel beam 110 to ensure alignment of keel beam fittings 150 to rear spar stiffeners 140 in later operations.

In some examples, method 400 further comprises (block 422) sealing center wing box 120 before attaching keel beam 110 to center wing box 120. This sealing operation is performed after attaching rear spar stiffener 140 to rear spar 122 of center wing box 120. In some examples, these stiffener attachment points are also sealed in center wing box 120 during this sealing operation.

In some examples, method 400 proceeds with (block 430) attaching keel beam 110 to center wing box 120. During this operation, keel beam 110 already has keel beam fitting 150 attached to keel beam 110. Furthermore, center wing box 120 has rear spar stiffener 140 attached to center wing box 120. These attachments were completed before and are described above with reference to block 410 and block 420. In some examples, keel beam fitting 150 and rear spar stiffener 140 are used for alignment of keel beam 110 and center wing box 120.

In some examples, method 400 proceeds with (block 440) attaching keel beam fitting 150 to rear spar stiffener 140. More specifically, in some examples, attaching keel beam fitting 150 to rear spar stiffener 140 comprising (block 442) attaching one or more splice plates 160 to each of keel beam fitting 150 and rear spar stiffener 140. For example, each of keel beam fitting 150 and rear spar stiffener 140 is stacked between first splice plate 161 and second splice plate 162. A first set of fasteners protrudes through a stack formed by first splice plate 161, web 144, and second splice plate 162. More specifically, each fastener in the first set protrudes through this stack formed by first splice plate 161, web 144, and second splice plate 162. Similarly, a second set of fasteners protrudes through a stack formed by first splice plate 161, fitting base wall 154, and second splice plate 162.

Aircraft Examples

In some examples, methods, and systems described above are used on aircraft and, more generally, by the aerospace industry. Specifically, these methods and systems can be used during the fabrication of aircraft as well as during aircraft service and maintenance.

Figure 7:
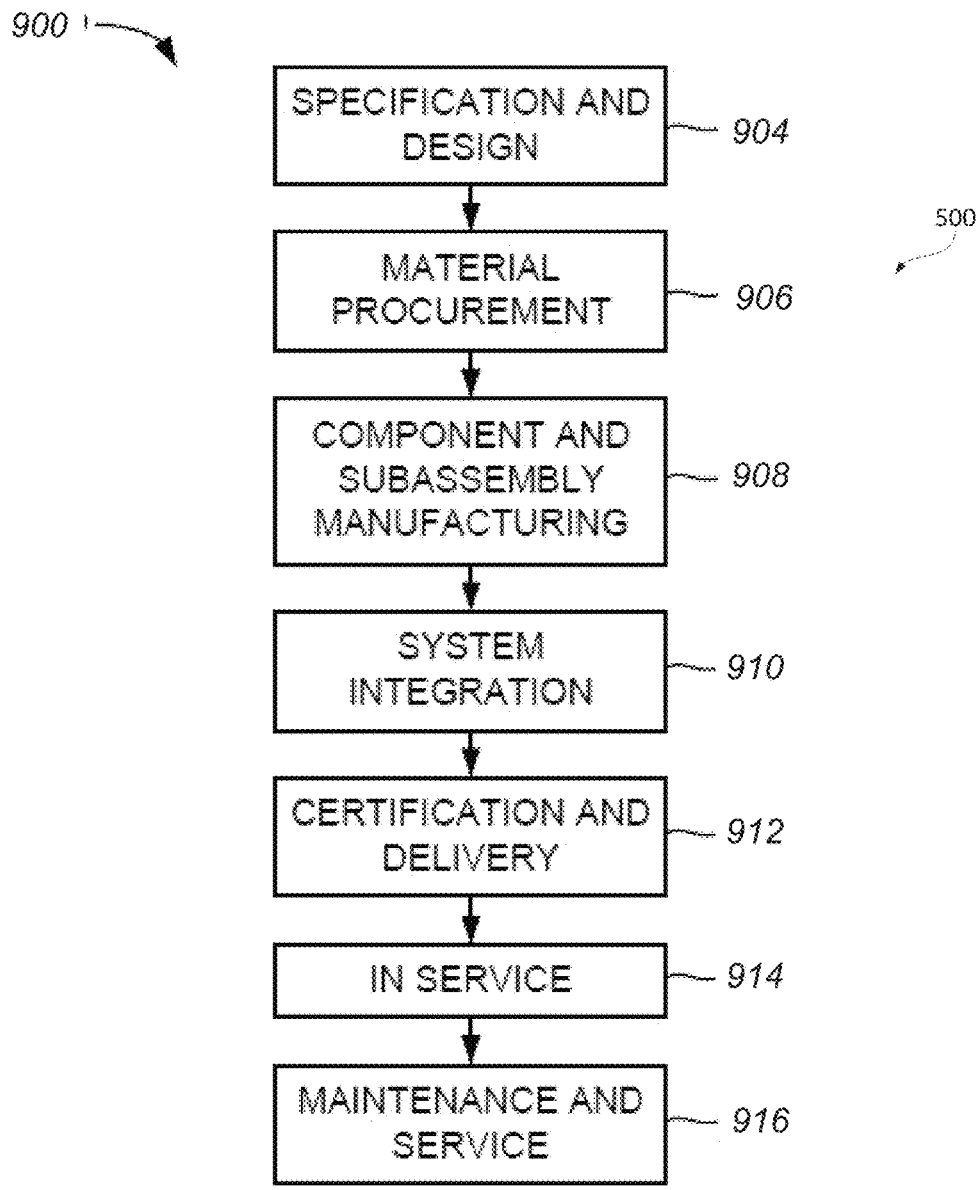
FIG. 7 is a process flowchart corresponding to a method for manufacturing and servicing the aircraft.
Figure 8:
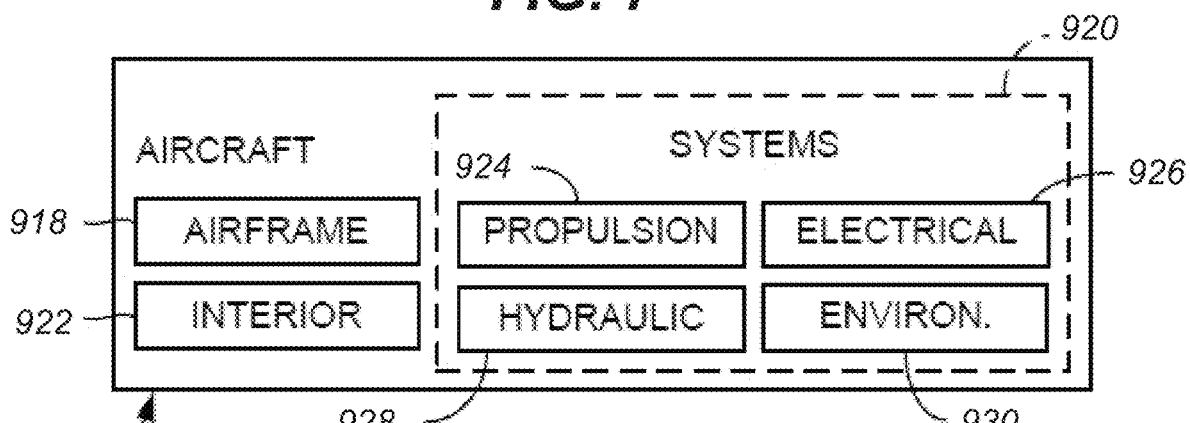
FIG. 8 illustrates a block diagram of an example aircraft, in accordance with some examples.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component, and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For this description, a system integrator includes without limitation any number of aircraft manufacturers and major-system subcontractors; a third party includes without limitation any number of vendors, subcontractors, and suppliers; and an operator can be an airline, leasing company, military entity, service organization, and so on.

As shown in FIG. 8, aircraft 902 produced by method 900 includes airframe 918 with plurality of systems 920 and interior 922. The airframe 918 includes the wings of the aircraft 902. Examples of systems 920 include one or more of propulsion system 924, electrical system 926, hydraulic system 928, and environmental system 930. Any number of other systems can be included.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof are utilized during manufacturing 908 and system integration 910, for example, by substantially expediting assembly of or reducing the cost of an aircraft 902. Similarly, one or more apparatus examples, method examples, or a combination thereof are utilized while aircraft 902 is in service, for example, and without limitation, to maintenance and service 916.

Further Examples

Further, the description includes examples according to the following clauses:

Clause 1. An aircraft, having a primary axis extending between a front end and a rear end of the aircraft, the aircraft comprising:

a keel beam, extending along the primary axis of the aircraft;

a center wing box, attached to the keel beam and comprising a rear spar, facing the rear end of the aircraft; and a rear spar integration assembly, comprising a rear spar stiffener and a keel beam fitting, attached to the rear spar stiffener, wherein:

the rear spar stiffener is attached to the rear spar of the center wing box and comprising a stiffener load axis, the keel beam fitting is attached to the keel beam and comprising a fitting load axis, parallel to the stiffener load axis and offset relative to the stiffener load axis in a direction of the primary axis of the aircraft.

Clause 2. The aircraft of clause 1, wherein the rear spar integration assembly further comprises one or more splice plates, attaching the keel beam fitting to the rear spar stiffener.

Clause 3. The aircraft of clause 2, wherein the one or more splice plates comprises a first splice plate and a second splice plate such that each of the keel beam fitting and the rear spar stiffener is stacked between the first splice plate and the second splice plate.

Clause 4. The aircraft of clause 3, wherein the keel beam fitting and the rear spar stiffener have no direct contact with each other.

Clause 5. The aircraft of any one of clauses 1-4, wherein the fitting load axis is offset relative to the stiffener load axis by between 40 millimeters and 60 millimeters.

Clause 6. The aircraft of any one of clauses 1-5, wherein the fitting load axis is offset relative to the stiffener load axis in a direction toward the front end of the aircraft.

Clause 7. The aircraft of any one of clauses 1-6, wherein:
the rear spar stiffener comprises a first chord, a second chord, and a web, collectively forming a stiffener open channel such that the first chord is parallel to the second chord and with the web interconnects the first chord and the second chord, and the second chord interfaces and is directly attached to the rear spar of the center wing box.

Clause 8. The aircraft of clause 7, wherein the web is used for attaching the rear spar stiffener to the keel beam fitting.

Clause 9. The aircraft of clause 7, wherein the rear spar stiffener further comprises one or more extensions, extending from the web and away from the second chord such that the second chord and the one or more extensions are coplanar.

Clause 10. The aircraft of clause 7, wherein the web is wider at a first end, facing the keel beam fitting, than at a second end, opposite the first end.

Clause 11. The aircraft of clause 7, wherein:
the keel beam fitting comprises a first fitting side wall, a second fitting side wall, and a fitting base wall, collectively forming an open fitting channel with the first fitting side wall being parallel to the second fitting side wall and with the fitting base wall interconnecting the first fitting side wall and the second fitting side wall, and the fitting base wall interfaces and is directly attached to the keel beam.

Clause 12. The aircraft of clause 11, wherein the fitting base wall and the web are coplanar.

13. The aircraft of clause 11, wherein the rear spar integration assembly further comprises one or more splice plates, interfacing and directly attached to each of the web and the fitting base wall.

Clause 14. The aircraft of clause 13, wherein at least one of the one or more splice plates protrudes into the stiffener open channel.

Clause 15. The aircraft of clause 11, wherein one or more splice plates comprise a first splice plate and a second splice plate such that each of the web and the fitting base wall is positioned between the first splice plate and second splice plate.

Clause 16. A method of manufacturing an aircraft, having a primary axis extending between a front end and a rear end of the aircraft, the method comprising:
attaching a keel beam fitting of a rear spar integration assembly to a keel beam;
attaching a rear spar stiffener of the rear spar integration assembly to a rear spar of a center wing box;
attaching the keel beam, with the keel beam fitting attached to the keel beam, to the center wing box, with the rear spar stiffener attached to the center wing box; and
attaching the keel beam fitting to the rear spar stiffener.

Clause 17. The method of clause 16, wherein attaching the keel beam fitting to the rear spar stiffener comprising attaching one or more splice plates to each of the keel beam fitting and the rear spar stiffener.

Clause 18. The method of any one of clauses 16-17, further comprising sealing the center wing box before attaching the keel beam to the center wing box.

Clause 19. The method of any one of clauses 16-18, wherein attaching the keel beam to the center wing box comprises aligning the rear spar stiffener to the keel beam fitting.

Clause 20. A rear spar integration assembly for installation on an aircraft comprising a keel beam and a center wing box, the rear spar integration assembly comprising:
a rear spar stiffener, comprising a first chord, a second chord, and a web, collectively forming a stiffener open channel such that the first chord is parallel to the second chord and such that the web interconnects the first chord and the second chord, the second chord is configured to interface and directly attach to a rear spar of the center wing box;
a keel beam fitting, comprising a first fitting side wall, a second fitting side wall, and a fitting base wall, collectively forming an open fitting channel such that the first fitting side wall is parallel to the second fitting side wall and such that the fitting base wall interconnects the first fitting side wall and the second fitting side wall, the fitting base wall is configured to interface and directly attach to the keel beam;
a first splice plate; and
a second splice plate, wherein the first splice plate and second splice plate are configured to stack with and attach to the web and the fitting base wall such that each of the web and the fitting base wall is positioned between the first splice plate and second splice plate.

Conclusion

Although the foregoing concepts have been described in some detail for purposes of clarity of understanding, it will be apparent that certain changes and modifications may be practiced within the scope of the appended clauses. It should be noted that there are many alternative ways of implementing the processes, systems, and apparatus. Accordingly, the present examples are to be considered as illustrative and not restrictive.

What is claimed is:

1. An aircraft, having a primary axis extending between a front end and a rear end of the aircraft, the aircraft comprising:
a keel beam, extending along the primary axis of the aircraft;
a center wing box, attached to the keel beam and comprising a rear spar, facing the rear end of the aircraft; and
a rear spar integration assembly, comprising a rear spar stiffener and a keel beam fitting, attached to the rear spar stiffener, wherein:
the rear spar stiffener is attached to the rear spar of the center wing box and comprising a stiffener load axis, the keel beam fitting is attached to the keel beam and comprising a fitting load axis, parallel to the stiffener load axis and offset relative to the stiffener load axis in a direction of the primary axis of the aircraft, wherein the fitting load axis is offset relative to the stiffener load axis in a direction toward the front end of the aircraft.

2. The aircraft of claim 1, wherein the rear spar integration assembly further comprises one or more splice plates, attaching the keel beam fitting to the rear spar stiffener.

3. The aircraft of claim 2, wherein the one or more splice plates comprises a first splice plate and a second splice plate such that each of the keel beam fitting and the rear spar stiffener is stacked between the first splice plate and the second splice plate.

4. The aircraft of claim 3, wherein the keel beam fitting and the rear spar stiffener have no direct contact with each other.

5. The aircraft of claim 1, wherein the fitting load axis is offset relative to the stiffener load axis by between 40 millimeters and 60 millimeters.

6. The aircraft of claim 1, wherein the rear spar integration assembly further comprises a plurality of splice plates, attaching the keel beam fitting to the rear spar stiffener.

7. The aircraft of claim 1, wherein:
the rear spar stiffener comprises a first chord, a second chord, and a web, collectively forming a stiffener open channel such that the first chord is parallel to the second chord and with the web interconnects the first chord and the second chord, and
the second chord interfaces and is directly attached to the rear spar of the center wing box.

8. The aircraft of claim 7, wherein the web is used for attaching the rear spar stiffener to the keel beam fitting.

9. The aircraft of claim 7, wherein the rear spar stiffener further comprises one or more extensions, extending from the web and away from the second chord such that the second chord and the one or more extensions are coplanar.

10. The aircraft of claim 7, wherein the web is wider at a first end, facing the keel beam fitting, than at a second end, opposite the first end.

11. The aircraft of claim 7, wherein:
the keel beam fitting comprises a first fitting side wall, a second fitting side wall, and a fitting base wall, collectively forming an open fitting channel with the first fitting side wall being parallel to the second fitting side wall and with the fitting base wall interconnecting the first fitting side wall and the second fitting side wall, and
the fitting base wall interfaces and is directly attached to the keel beam.

12. The aircraft of claim 11, wherein the fitting base wall and the web are coplanar.

13. The aircraft of claim 11, wherein the rear spar integration assembly further comprises one or more splice plates, interfacing and directly attached to each of the web and the fitting base wall.

14. The aircraft of claim 13, wherein at least one of the one or more splice plates protrudes into the stiffener open channel.

15. The aircraft of claim 11, wherein one or more splice plates comprise a first splice plate and a second splice plate such that each of the web and the fitting base wall is positioned between the first splice plate and second splice plate.

16. A method of manufacturing an aircraft, having a primary axis extending between a front end and a rear end of the aircraft, the method comprising:
attaching a keel beam fitting of a rear spar integration assembly to a keel beam;
attaching a rear spar stiffener of the rear spar integration assembly to a rear spar of a center wing box and comprising a stiffener load axis;
attaching the keel beam, with the keel beam fitting attached to the keel beam, to the center wing box, with the rear spar stiffener attached to the center wing box, and the keel beam fitting comprising a fitting load axis; and
attaching the keel beam fitting to the rear spar stiffener, the fitting load axis, parallel to the stiffener load axis and offset relative to the stiffener load axis in a direction of the primary axis of the aircraft, wherein the fitting load axis is offset relative to the stiffener load axis in a direction toward the front end of the aircraft.

17. The method of claim 16, wherein attaching the keel beam fitting to the rear spar stiffener comprising attaching one or more splice plates to each of the keel beam fitting and the rear spar stiffener.

18. The method of claim 16, further comprising sealing the center wing box before attaching the keel beam to the center wing box.

19. The method of claim 16, wherein attaching the keel beam to the center wing box comprises aligning the rear spar stiffener to the keel beam fitting.

20. A rear spar integration assembly for installation on an aircraft, having a primary axis extending between a front end and a rear end of the aircraft, comprising a keel beam and a center wing box, the rear spar integration assembly comprising:
a rear spar stiffener, comprising a first chord, a second chord, and a web, collectively forming a stiffener open channel such that the first chord is parallel to the second chord and such that the web interconnects the first chord and the second chord, the second chord is configured to interface and directly attach to a rear spar of the center wing box, the rear spar stiffener further comprising a stiffener load axis;
a keel beam fitting, comprising a first fitting side wall, a second fitting side wall, and a fitting base wall, collectively forming an open fitting channel such that the first fitting side wall is parallel to the second fitting side wall and such that the fitting base wall interconnects the first fitting side wall and the second fitting side wall, the fitting base wall is configured to interface and directly attach to the keel beam, and the keel beam fitting comprising a fitting load axis, parallel to the stiffener load axis and offset relative to the stiffener load axis in a direction of the primary axis of the aircraft, wherein the fitting load axis is offset relative to the stiffener load axis in a direction toward the front end of the aircraft;
a first splice plate; and
a second splice plate, wherein the first splice plate and second splice plate are configured to stack with and attach to the web and the fitting base wall such that each of the web and the fitting base wall is positioned between the first splice plate and second splice plate.

* * * * *